(12) United States Patent
Gu et al.

(10) Patent No.: US 11,642,800 B2
(45) Date of Patent: May 9, 2023

(54) APPARATUS AND METHOD FOR USE WITH ROBOT

(71) Applicant: ABB Schweiz AG, Baden (CH)

(72) Inventors: Hao Gu, Shanghai (CN); Cheng Li, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 282 days.

(21) Appl. No.: 16/882,888

(22) Filed: May 26, 2020

(65) Prior Publication Data

US 2020/0282576 A1 Sep. 10, 2020

Related U.S. Application Data

(63) Continuation of application No. PCT/CN2017/113187, filed on Nov. 27, 2017.

(51) Int. Cl.
*B25J 19/02* (2006.01)
*B25J 9/16* (2006.01)
*G05B 19/401* (2006.01)

(52) U.S. Cl.
CPC ........... *B25J 19/021* (2013.01); *B25J 9/1612* (2013.01); *G05B 19/401* (2013.01);
(Continued)

(58) Field of Classification Search
CPC ...... B25J 19/021; B25J 9/1612; B25J 9/1694; B25J 9/1697; G05B 19/401;
(Continued)

(56) References Cited

U.S. PATENT DOCUMENTS

2010/0161125 A1* 6/2010 Aoba .................... B25J 9/1692
700/254
2013/0238124 A1 9/2013 Suzuki et al.
(Continued)

FOREIGN PATENT DOCUMENTS

CN 103600353 A 2/2014
CN 104354147 A 2/2015
(Continued)

OTHER PUBLICATIONS

Gong, M., et al., "A novel method of surface-normal measurement in robotic drilling for aircraft fuselage using three laser range sensor", the 2012 IEEE/ASME International Conference on Advanced Intelligent Mechatronics, Jul. 11-14, 2012, Kaohsiung, Taiwan, pp. 450-455, XP032222527.
(Continued)

*Primary Examiner* — Nicholas Kiswanto
*Assistant Examiner* — Madison B Emmett
(74) *Attorney, Agent, or Firm* — Greenberg Traurig, LLP

(57) ABSTRACT

An apparatus and method for calibrating or teaching a robot, the apparatus includes a reflective photoelectric sensor arranged on a gripper of the robot and a controller. The controller is configured to: cause the reflective photoelectric sensor to scan over a target object; monitor changes in an output signal from the reflective photoelectric sensor; for each detected change exceeding a threshold, determine a coordinate of a gripping component on the gripper in a robot coordinate system, to obtain a set of coordinates; determine a position of the target object in the robot coordinate system based on the set of coordinates and a predefined offset value (PO) between the reflective photoelectric sensor and the gripping component; and store the position of target object for future use in assembling objects.

20 Claims, 5 Drawing Sheets

(52) U.S. Cl.
CPC .............. *G05B 2219/36415* (2013.01); *G05B 2219/37283* (2013.01); *G05B 2219/39024* (2013.01)

(58) Field of Classification Search
CPC ........... G05B 2219/36415; G05B 2219/37283; G05B 2219/39024; G05B 2219/37125; G05B 2219/37286; G05B 2219/40033; G05B 2219/40555
See application file for complete search history.

(56) References Cited

U.S. PATENT DOCUMENTS

| | | | |
|---|---|---|---|
| 2013/0325181 A1* | 12/2013 | Moore | B25J 13/086 901/31 |
| 2015/0273692 A1* | 10/2015 | Ogawara | B25J 19/021 901/9 |
| 2016/0001445 A1* | 1/2016 | Setsuda | G05B 19/425 700/260 |
| 2016/0199140 A1 | 7/2016 | Gombert et al. | |
| 2018/0126553 A1* | 5/2018 | Corkum | G05B 19/423 |
| 2018/0209780 A1* | 7/2018 | Schattenburg | G01B 11/002 |
| 2018/0257234 A1* | 9/2018 | Shimazu | B25J 9/1697 |
| 2020/0164518 A1* | 5/2020 | Lager | B25J 9/1697 |

FOREIGN PATENT DOCUMENTS

| | | |
|---|---|---|
| CN | 104354157 A | 2/2015 |
| CN | 104786226 A | 7/2015 |
| CN | 105666485 A | 6/2016 |
| CN | 107186696 A | 9/2017 |
| JP | H1185234 A | 3/1999 |
| WO | 2017015898 A1 | 2/2017 |

OTHER PUBLICATIONS

Liu, Y., et al., "A visual positioning and measurement system for robotic drilling", 2016 IEEE 14th International Workshop on Advanced Motion Control, IEEE, Apr. 22, 2016, pp. 461-466, XP032914184.
European Search Report, dated Jun. 22, 2021, from related European Patent Application No. 17932612.9.
State Intellectual Property Office of the P.R. China, International Search Report & Written Opinion issued in corresponding Application No. PCT/CN2017/113187, dated Aug. 30, 2018, 10pp.
Janule; "Sensor and Automatic Detection Technology"; Western Ann Electron Technology University Press; Apr. 2016; pp. 109-113. (English Abstract).
China First Office Action; issued by the National Intellectual Property Administration; regarding corresponding patent application Serial No. CN 201780096821.1; dated Aug. 22, 2022; 32 pages (including English translation).

* cited by examiner

APPARATUS AND METHOD FOR USE WITH ROBOT

FIELD

Embodiments of present disclosure generally relate to the field of industrial robots, and more particularly, to an apparatus and a method for use with a robot.

BACKGROUND

Industrial robots are widely used in various manufacturing applications, such as assembling objects such as household appliance components, automobile parts, or the like. A robot for assembling objects is able to repetitively move objects, gripped by a gripper connected to a robot arm of the robot, from a position to another position. In order to carry out such movements precisely, the robot must be calibrated in advance. In other words, the robot must first be taught about the above positions.

Traditionally the robot teaching is done manually by a human operator. The operator manually controls the robot arm to position the gripper of the robot or an object gripped by the gripper in desired positions. Once so positioned, the positions of the gripper are recorded so that the robot can return the gripper to these positions in later process of assembling objects.

However, the robot teaching often requires a big engineering effort in robot applications. The accuracy of the positioning is subject to the skill and visual acuity of the operator. Especially for accurate assembly, precise positioning of the gripper is hardly achieved without a skillful and patient engineer. Accordingly, there is a need for a new solution for use with a robot that will allow the calibrating or teaching of the robot to be performed quickly and accurately.

SUMMARY

In a first aspect of the present disclosure, an apparatus for use with a robot is provided. The apparatus comprises a reflective photoelectric sensor arranged on a gripper of the robot; and a controller configured to: cause the reflective photoelectric sensor to scan over a target object; monitor changes in an output signal from the reflective photoelectric sensor; for each detected change exceeding a threshold, determine a coordinate of a gripping component on the gripper in a robot coordinate system, to obtain a set of coordinates; determine a position of the target object in the robot coordinate system based on the set of coordinates and a predefined offset value between the reflective photoelectric sensor and the gripping component; and store the position of the target object for future use in assembling objects.

In some embodiments, the position of the target object is stored as a gripping position of the gripping component.

In some embodiments, the position of the target object is stored as a dropping position of the gripping component.

In some embodiments, the gripping component includes a clamping jaw, a vacuum chuck, or an electromagnet.

In some embodiments, the apparatus further comprises a camera, and the controller is further configured to: cause the gripping component to grip the target object; cause the camera to capture an image containing the reflective photoelectric sensor and the target object gripped by the gripping component; and determine, from the image, an actual offset value between the reflective photoelectric sensor and the target object gripped by the gripping component, as the predefined offset value.

In some embodiments, the reflective photoelectric sensor is a first reflective photoelectric sensor, the apparatus further comprises a second reflective photoelectric sensor arranged on the gripper, and the controller is further configured to: align the gripping component with the target object in orientation based on output signals from the first and second reflective photoelectric sensors.

In some embodiments, the controller is configured to align the gripping component with the target object in orientation by: causing the first and second reflective photoelectric sensors to move towards a side of the target object; determining a first time point when a change in the output signal from the first reflective photoelectric sensor exceeds the threshold; determining a second time point when a change in the output signal from the second reflective photoelectric sensor exceeds the threshold; and if the first time point is different from the second time point, causing the gripper to rotate to align the gripping component with the target object in orientation.

In some embodiments, the reflective photoelectric sensor is a first reflective photoelectric sensor, the apparatus further comprises a third and a fourth reflective photoelectric sensors arranged on the gripper, and the controller is further configured to: cause a lower surface of the gripping component to be parallel to an upper surface of the target object based on output signals from the first, third and fourth reflective photoelectric sensors.

In some embodiments, the controller is configured to cause the lower surface of the gripping component to be parallel to the upper surface of the target object by: causing the first, third and fourth reflective photoelectric sensors to locate above the target object; determining respective distances between the upper surface of the target object and the first, third and fourth reflective photoelectric sensors based on the output signals from the first, third and fourth reflective photoelectric sensors; and if at least one of the distances is different from the others, causing the gripper to rotate such that the lower surface of the gripping component is parallel to the upper surface of the target object.

In some embodiments, the reflective photoelectric sensor is a reflective optical fiber sensor or a laser displacement sensor.

In a second aspect of the present disclosure, a method for use with a robot is provided. The method comprises causing a reflective photoelectric sensor arranged on a gripper of the robot to scan over a target object; monitoring changes in an output signal from the reflective photoelectric sensor; for each detected change exceeding a threshold, determining a coordinate of a gripping component on the gripper in a robot coordinate system, to obtain a set of coordinates; determining a position of the target object in the robot coordinate system based on the set of coordinates and a predefined offset value between the reflective photoelectric sensor and the gripping component; and storing the position of the target object for future use in assembling objects.

In some embodiments, the position of the target object is stored as a gripping position of the gripping component.

In some embodiments, the position of the target object is stored as a dropping position of the gripping component.

In some embodiments, the gripping component includes a clamping jaw, a vacuum chuck, or an electromagnet.

In some embodiments, the method further comprises: causing the gripping component to grip the target object; causing a camera to capture an image containing the reflective photoelectric sensor and the target object gripped by the gripping component; and determining, from the image, an actual offset value between the reflective photoelectric sensor and the target object gripped by the gripping component, as the predefined offset value.

In some embodiments, the reflective photoelectric sensor is a first reflective photoelectric sensor, and the method further comprises: aligning the gripping component with the target object in orientation based on output signals from the first reflective photoelectric sensor and a second reflective photoelectric sensor arranged on the gripper.

In some embodiments, aligning the gripping component with the target object in orientation comprises: causing the first and second reflective photoelectric sensors to move towards a side of the target object; determining a first time point when a change in the output signal from the first reflective photoelectric sensor exceeds the threshold; determining a second time point when a change in the output signal from the second reflective photoelectric sensor exceeds the threshold; and if the first time point is different from the second time point, causing the gripper to rotate to align the gripping component with the target object in orientation.

In some embodiments, the reflective photoelectric sensor is a first reflective photoelectric sensor, and the method further comprises: causing a lower surface of the gripping component to be parallel to an upper surface of the target object based on output signals from the first reflective photoelectric sensor, and a third and a fourth reflective photoelectric sensors arranged on the gripper.

In some embodiments, causing the lower surface of the gripping component to be parallel to the upper surface of the target object comprises: causing the first, third and fourth reflective photoelectric sensors to locate above the target object; determining respective distances between the upper surface of the target object and the first, third and fourth reflective photoelectric sensors based on the output signals from the first, third and fourth reflective photoelectric sensors; and if at least one of the distances is different from the others, causing the gripper to rotate such that the lower surface of the gripping component is parallel to the upper surface of the target object.

In some embodiments, the reflective photoelectric sensor is a reflective optical fiber sensor or a laser displacement sensor.

In a third aspect of the present disclosure, a robot comprising the apparatus according to the first aspect of the present disclosure is provided.

In a fourth aspect of the present disclosure, a device is provided. The device comprises: a processing unit; and a memory coupled to the processing unit and storing instructions thereon, the instructions, when executed by the processing unit, causing the device to perform the method according to the second aspect of the present disclosure.

According to various embodiments of the present disclosure, the apparatus and method for use with the robot provide a new solution for calibrating or teaching the robot. Such sensor-based robot calibrating or teaching scheme can detect a plurality of edge points on the target object automatically and hence determine the position of the target object precisely for use in assembling objects. In this way, the calibrating or teaching of the robot can be performed quickly and accurately.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
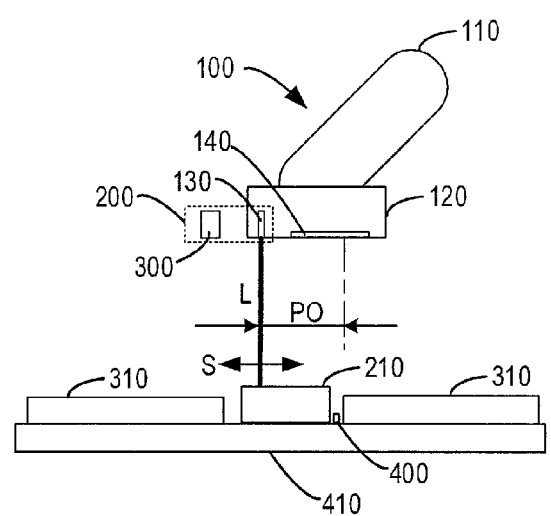
FIG. 1 schematically illustrates a scanning motion of an apparatus for use with a robot according to some example embodiments over a target object.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

FIG. 1 schematically illustrates a scanning motion of an apparatus 200 for use with a robot 100 according to some example embodiments over a target object 210. As shown, the target object 210 is supplied by a feeder 310 onto a work table 410 and supported by the work table 410. The robot 100 includes a robot arm 110 and a gripper 120 connected to the robot arm 110. The gripper 120 is driven by the robot arm 110 so as to move between different positions above the work table 410. The gripper 120 includes a gripping component 140 operable to grip and drop an object, such as the target object 210.

In an embodiment, the gripping component 140 may be a clamping jaw having two or more fingers for grasping the target object 210. Alternatively, in another embodiment, the gripping component 140 may be an adhesive component, such as a vacuum chuck or an electromagnet. It is to be understood that the gripping component 140 can be of suitable types other than the examples as described above. The present disclosure does not intend to limit the type of the gripping component 140.

In order to grip the target object 210 for assembling objects, a position of the target object 210 needs to be determined in advance and recorded as a gripping position of the gripping component 140. Hereafter, the apparatus 200 for use with the robot 100 to determine the position of the target object 210 will be described in detail with reference to FIG. 1.

In general, the apparatus 200 includes a reflective photoelectric sensor 130 and a controller 300. It is to be understood that the components in the drawings are not drawn in scale. Rather, it is just for illustration.

The reflective photoelectric sensor 130 is arranged on the gripper 120. In operation, the reflective photoelectric sensor 130 is configured to emit a light beam L towards the target object 210 and the work table 410, and to receive a reflected light beam. In an embodiment, the reflective photoelectric sensor 130 may be a reflective optical fiber sensor. In response, the reflective optical fiber sensor generates an output signal representative of light intensity of the reflected light beam. Changes in the output signal from the reflective optical fiber sensor can represent at least one of the following: color change of the objects, distance change between the reflective optical fiber sensor and the objects, texture change of the objects, and angle change of the objects.

In another embodiment, the reflective photoelectric sensor 130 may be implemented by a laser displacement sensor. The laser displacement sensor generates an output signal representative of respective distances between the laser displacement sensor and the objects. Changes in the output signal from the laser displacement sensor can represent distance change between the laser displacement sensor and the objects.

It is to be understood that the reflective photoelectric sensor 130 can be of suitable types other than the examples as described above. The present disclosure does not intend to limit the type of the reflective photoelectric sensor 130.

The controller 300 of the apparatus 200 may be implemented by any dedicated or general-purpose processor, controller, circuitry, or the like. In some embodiments, the controller 300 may be the controller for the robot 100 as well.

In order to determine the position of the target object 210, the controller 300 is configured to cause the reflective photoelectric sensor 130 to scan over the target object 210. In an example, under the control of the controller 300, the reflective photoelectric sensor 130 may scan over the target object 210 along a predefined direction S, as shown in FIG. 1. In another example, the reflective photoelectric sensor 130 may scan over the target object 210 along the predefined direction S first and then along other directions different from the predefined direction S.

It is to be understood that the reflective photoelectric sensor 130 may scan over the target object 210 along any direction other than the examples as described above. The present disclosure does not intend to limit the scanning direction of the reflective photoelectric sensor 130. Hereinafter, example scanning directions of the reflective photoelectric sensor 130 will be described in detail with reference to FIG. 2.

During the scanning, the controller 300 monitors changes in the output signal from the reflective photoelectric sensor 130. As an example, in those embodiments where the reflective photoelectric sensor 130 is implemented by a reflective optical fiber sensor, the changes in the output signal from the reflective optical fiber sensor can represent at least one of the following: color change of the objects, distance change between the reflective optical fiber sensor and the objects, texture change of the objects, and angle change of the objects. When the reflective photoelectric sensor 130 is implemented by a laser displacement sensor, the changes in the output signal from the laser displacement sensor can represent distance change between the laser displacement sensor and the objects.

If a change is detected to exceed a threshold, then it can be considered that an edge point of target object 210 is found. In response, the controller 300 may determine a coordinate of the gripping component 140 at that moment in a robot coordinate system. By determining and recording the coordinate of the gripping component 140 each time when the change of the output signal of the reflective photoelectric sensor 130 exceeds the threshold, a set of coordinates are obtained. These coordinates represent the positions of the gripping component 140 when edge points of the target object 210 are found by the reflective photoelectric sensor 130.

The threshold may be pre-stored in any suitable storage or memory accessible to the controller 300. During the scanning, a change in the output signal from the reflective photoelectric sensor 130 may be tiny. Such a tiny change would not imply that an edge point of the target object 210 is found. Only when the detected change exceeds the threshold, it is determined that the edge point of target object 210 is detected. In this way, the edge points of the target object 210 may be precisely detected.

Then, based on the set of coordinates and a predefined offset value PO between the reflective photoelectric sensor 130 and the gripping component 140, the controller 300 determines the position of the target object 210 in the robot coordinate system. The predefined offset value "PO" represents the distance and orientation between the reflective photoelectric sensor 130 and the gripping component 140. Accordingly, based on the predefined offset value PO, the controller 300 may convert the obtained set of coordinates of the gripping component 140 into the position of the target object 210 in the robot coordinate system.

The predefined offset value PO may be determined or measured and stored in advance. In an example, the predefined offset value PO may be preset by an operator in view of the distance and orientation between the reflective photoelectric sensor 130 and the gripping component 140.

In another example, the apparatus 200 may further include a camera 400 for determining the predefined offset value PO. An example process for determining the predefined offset value PO using the camera 400 will be described in detail hereinafter with reference to FIG. 3. It is to be understood that the predefined offset value PO can be measured or set in any other suitable manners. The present disclosure does not intend to limit the manners of obtaining the predefined offset value PO.

Upon determination of the position of the target object 210, the controller 300 stores the position of the target object 210 into any accessible storage or memory, for future use in assembling objects, which will be discussed later.

In the embodiment as depicted in FIG. 1, the position of the target object 210 in the robot coordinate system may represent the gripping position of the gripping component 140. In future assembling process, based on the stored positions, the gripping component 140 may return to the gripping position repetitively and grip the target object 210 at the gripping position.

With the apparatus 200 as described above, the position of the target object 210 can be well-taught and then determined precisely for future use in assembling objects. In this way, the calibration or teaching of the robot 100 can be performed quickly and accurately without the need of human intervention.

In the following, an example process of scanning the target object 210 using the reflective photoelectric sensor 130 will be described in detail with reference to FIG. 2. As shown, the target object 210 may be of a circular shape. The reflective photoelectric sensor 130 starts the scanning at point sp0 and moves along a predefined direction S. As such, a pair of edge points sp1 and sp2 of the target object 210 can be found. The reflective photoelectric sensor 130 then moves to a middle point cp1 between the edge points sp1 and sp2 and scans along a direction S' orthogonal to the predefined direction S. As such, a further pair of edge points sp3 and sp4 of the target object 210 can be found. The middle point cp2 between the edge points sp3 and sp4 is the center of the target object 210. In some embodiments, the position of the target object 210 may be represented by the coordinate of the middle point cp2 in the robot coordinate system.

Figure 2:
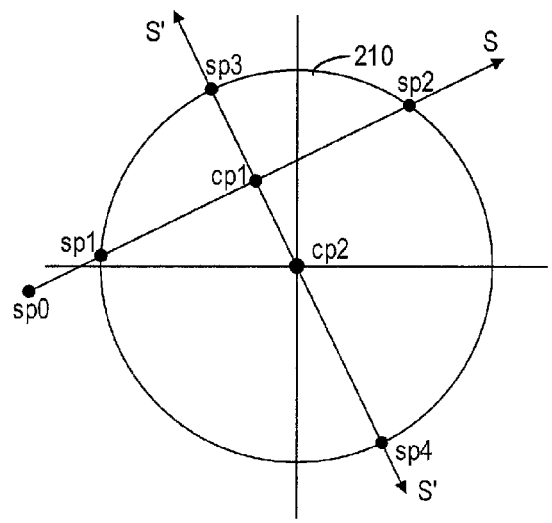
FIG. 2 schematically illustrates an example process of scanning the target object using the reflective photoelectric sensor.

It is to be understood that the embodiment as shown in FIG. 2 is just for illustration, without suggesting any limitations as to the scope of the present disclosure. In other embodiments, the target object 210 may be of any other shapes, such as triangle, square, hexagon or irregular shape. The present disclosure does not intend to limit the shape of the target object 210.

Figure 3:
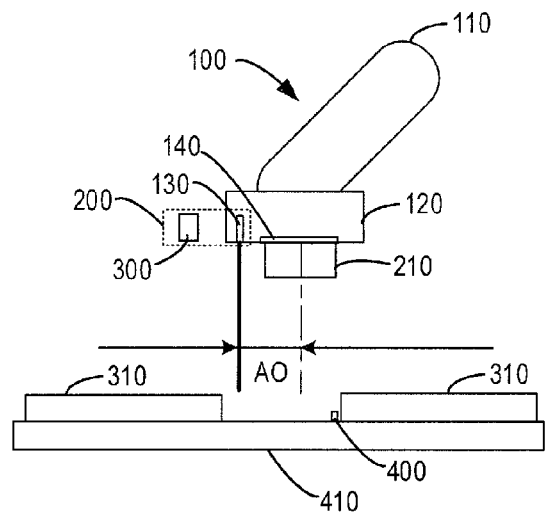
FIG. 3 schematically illustrates an example of obtaining the predefined offset value between the reflective photoelectric sensor and the target object gripped by a gripping component.

FIG. 3 schematically illustrates an example of obtaining the predefined offset value "PO" between the reflective photoelectric sensor 130 and the target object 210 gripped by the gripping component 140. For ease of discussion, the gripping component 140 is described as a clamping jaw in this embodiment.

In general, in order to determine the PO, the controller 300 may cause the gripping component 140 to grip the target object 210 and then reposition the target object 210 by the fingers of the clamping jaw. In this event, an actual offset value "AO" between the reflective photoelectric sensor 130 and the target object 210 can be determined and used as the predefined offset value PO.

Specifically, as described above, the apparatus 200 may further include a camera 400. After the target object 210 is gripped by the gripping component 140, the controller 300 may cause the camera 400 to capture an image containing the reflective photoelectric sensor 130 and the target object 210 gripped by the gripping component 140. In an example, the camera 400 may be disposed on the work table 410. In another example, the camera 400 may be disposed at other positions. Then, the controller 300 may determine, from the image, the actual offset value AO and store the actual offset value AO in the memory as the predefined offset value PO.

It is to be understood that the value of PO can be determined by any suitable means other than the one as described with reference to FIG. 3. For example, it is possible to manually measure the value and then input to the apparatus 200.

Figure 4:
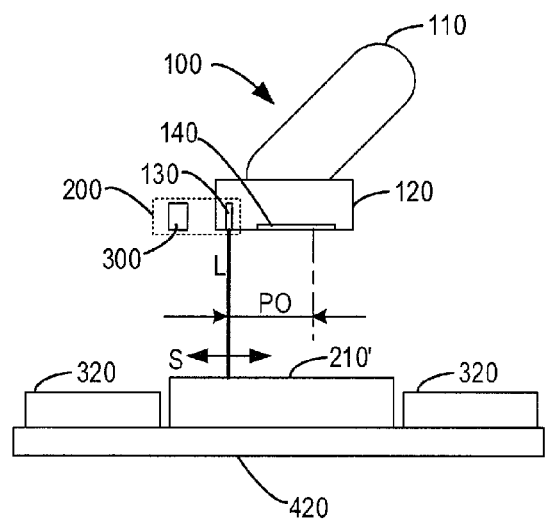
FIG. 4 schematically illustrates a scanning motion of the apparatus as shown in FIG. 1 over a target object.

FIG. 4 schematically illustrates a scanning motion of the apparatus 200 as shown in FIG. 1 over a target object 210'. In this example, the target object 210' is held by a fixture 320 on a work table 420. The target object 210' may be used to receive another object (e.g., the target object 210 shown in FIG. 1) for assembling. In an embodiment, the position of the target object 210' may be determined by the controller 300 in the similar manner as determining the target object 210 and stored as a dropping position of the gripper 120. In assembling objects, the gripping component 140 may move to the dropping position and drop the target object 210 onto the target object 210' at the dropping position.

In some embodiments, with the stored gripping position and dropping position of the gripping component 140, the robot 100 may assemble objects using these positions. In this regard, FIG. 5 schematically illustrates an example process of gripping the target object 210 by the gripping component 140, and FIG. 6 schematically illustrates an example process of dropping the target object 210 gripped by the gripping component 140 onto the target object 210'.

Figure 5:
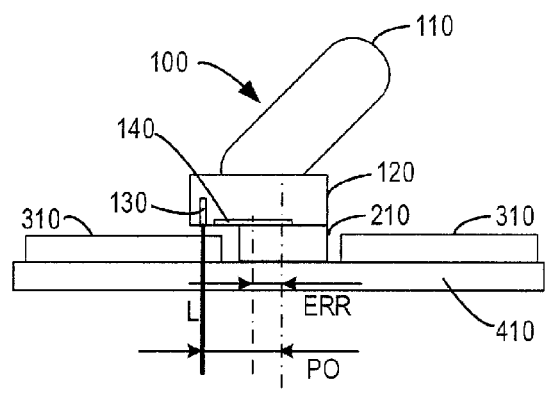
FIG. 5 schematically illustrates an example process of gripping the target object by the gripping component.
Figure 6:
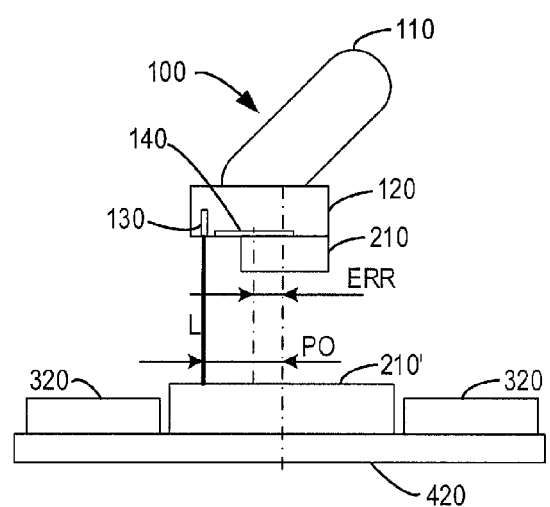
FIG. 6 schematically illustrates an example process of dropping the target object gripped by the gripping component onto the target object.

The gripping component 140 as shown in FIGS. 5 and 6 may be an adhesive component, such as a vacuum chuck or an electromagnet, for example. As shown in FIG. 5, the gripping component 140 grips the target object 210 at the gripping position determined based on the predefined offset PO. If the predefined offset PO is not accurate, an aligning error ERR may exist between the gripping component 140 and the gripped target object 210. As shown in FIG. 6, since the dropping position of the gripping component 140 is determined based on the same predefined offset PO, the aligning error ERR in gripping the target object 210 can be compensated when dropping the target object 210 onto the target object 210'. Thus, the target object 210 and the target object 210' can be properly aligned with each other.

Figure 7:
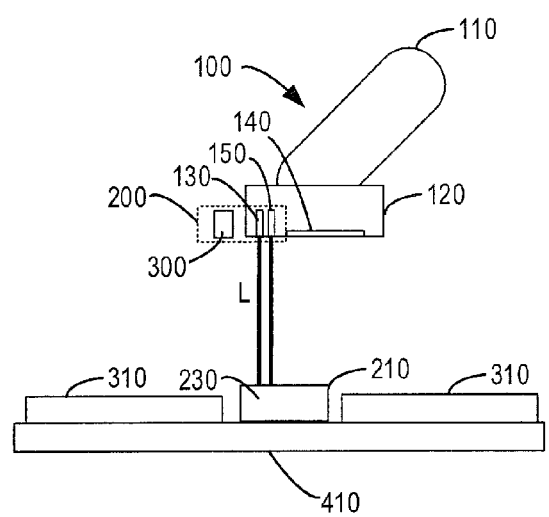
FIG. 7 schematically illustrates an example process of aligning a gripping component of the gripper with the target object in orientation using an apparatus for use with a robot according to another example embodiment.

In some cases, the orientation of the gripping component 140 may be not aligned with the target object 210 in orientation. This would result in that the gripping component 140 may be unable to grip the target 210 precisely. FIG. 7 schematically illustrates an example process of aligning the gripping component 140 with the target object 210 in orientation using an apparatus 200 for use with the robot 100 according to another example embodiment.

The apparatus 200 as shown in FIG. 7 differs from the apparatus 200 as shown in FIG. 1 in that in addition to the reflective photoelectric sensor 130, there is another reflective photoelectric sensor 150 arranged on the gripper 120. For ease of discussion, the reflective photoelectric sensor 130 may be referred to as a first reflective photoelectric sensor, and the reflective photoelectric sensor 150 may be referred to as a second reflective photoelectric sensor. The first and second reflective photoelectric sensor 130, 150 may be of the same or different types. With the first and second reflective photoelectric sensor 130, 150, the controller 300 may align the gripping component 140 with the target object 210 in orientation based on output signals from the first and second reflective photoelectric sensors 130, 150.

Specifically, in an embodiment, the controller 300 may cause the first and second reflective photoelectric sensors 130, 150 to move towards a side 230 of the target object 210. During the moving, the controller 300 may determine a first time point when a change in the output signal from the first reflective photoelectric sensor 130 exceeds the threshold. Likewise, the controller 300 may determine a second time point when a change in the output signal from the second reflective photoelectric sensor 150 exceeds the threshold. If the first time point is the same as the second time point, then it can be determined that the gripping component 140 is already aligned with the target object 210 in orientation. Otherwise, if the first time point is different from the second time point, the controller 300 may cause the gripper 120 to rotate to align the gripping component 140 with the target object 210 in orientation. In this way, the gripping component 140 can be aligned with the target object 210 in orientation properly.

Figure 8:
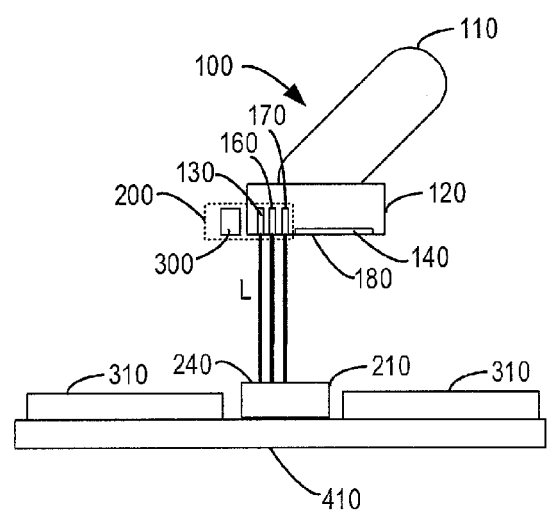
FIG. 8 schematically illustrates an example process of causing a lower surface of the gripping component to be parallel to an upper surface of the target object using an apparatus for use with a robot according to a further example embodiment.

In some cases, a lower surface 180 of the gripping component 140 may be not parallel to an upper surface 240 of the target object 210. This would result in that the gripping component 140 may be unable to grip the target 210 precisely. FIG. 8 schematically illustrates an example process of causing a lower surface 180 of the gripping component 140 to be parallel to an upper surface 240 of the target object 210 using an apparatus 200 for use with the robot 100 according to a further example embodiment.

The apparatus 200 as shown in FIG. 8 differs from the apparatus 200 as shown in FIG. 1 in that a third and a fourth reflective photoelectric sensors 160, 170 are arranged on the gripper 120. In this embodiment, the reflective photoelectric sensor 130 may be still referred to as the first reflective photoelectric sensor. The first, third and fourth reflective photoelectric sensors 130, 160, 170 may be of the same or different types. In an embodiment, the first, third and fourth reflective photoelectric sensors 130, 160, 170 may be arranged to be non-collinear. With the first, third and fourth reflective photoelectric sensors 130, 160, 170, the controller 300 may cause the lower surface 180 of the gripping component 140 to be parallel to the upper surface 240 of the target object 210 based on output signals from the first, third and fourth reflective photoelectric sensors 130, 160, 170.

In an embodiment, the controller 300 may cause the first, third and fourth reflective photoelectric sensors 130, 160, 170 to locate above the target object 210. Then, the controller 300 may determine respective distances between the upper surface 240 of the target object 210 and the first, third and fourth reflective photoelectric sensors 130, 160, 170 based on the output signals from the first, third and fourth reflective photoelectric sensors 130, 160, 170. If the distances are the same as each other, then it can be determined that the lower surface 180 of the gripping component 140 is parallel to the upper surface 240 of the target object 210. Otherwise, if at least one of the distances is different from the others, the controller may cause the gripper 120 to rotate such that the lower surface 180 of the gripping component 140 is parallel to the upper surface 240 of the target object 210. In this way, the gripping component 140 can be better aligned with the target object 210.

In other embodiments, one or more additional reflective photoelectric sensors may be arranged on the gripper 120 so as to calculate the robot 100 with more degrees of freedom.

Figure 9:
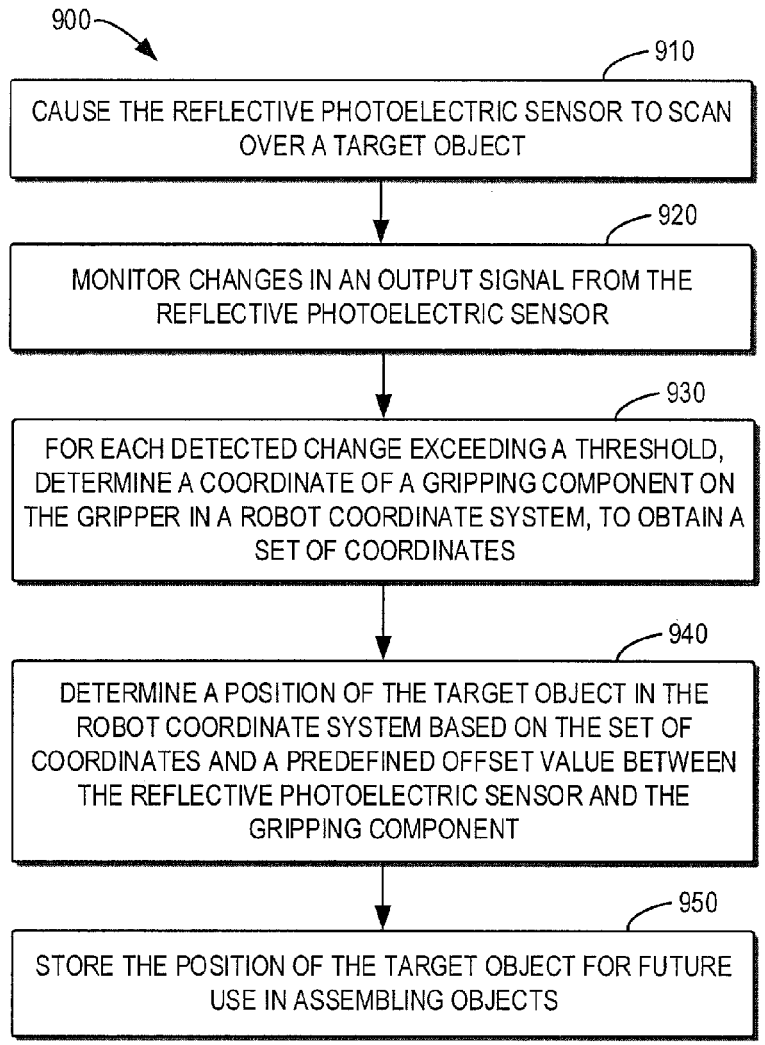
FIG. 9 is a flow chart of a method for use with a robot according to embodiments of the present disclosure.

FIG. 9 is a flow chart of a method for use with a robot according to embodiments of the present disclosure. The method 900 can be carried out by, for example the apparatus 200 for use with the robot 100 as illustrated in FIGS. 1 and 3-8.

At block 910, a reflective photoelectric sensor 130 arranged on a gripper 120 of the robot 100 is caused to scan over a target object 210, 210'. For example, in some embodiments, the reflective photoelectric sensor 130 is a reflective optical fiber sensor or a laser displacement sensor.

At block 920, changes in an output signal from the reflective photoelectric sensor 130 are monitored. As described above, significant changes of the output signals may represent the detection of edges of the target object 210, 201'.

At block 930, for each detected change exceeding a threshold, a coordinate of a gripping component 140 on the gripper 120 in a robot coordinate system is determined, to obtain a set of coordinates. In some embodiments, the gripping component 140 includes a clamping jaw, a vacuum chuck, or an electromagnet.

At block 940, a position of the target object 210, 210' in the robot coordinate system is determined based on the set of coordinates and a predefined offset value PO between the reflective photoelectric sensor 130 and the gripping component 140.

In some embodiments, the method 900 further comprises: causing the gripping component 140 to grip the target object 210; causing a camera to capture an image containing the reflective photoelectric sensor 130 and the target object 210 gripped by the gripping component 140; and determining, from the image, an actual offset value AO between the reflective photoelectric sensor 130 and the target object 210 gripped by the gripping component 140, as the predefined offset value PO.

At block 950, the position of the target object 210, 210' is stored for future use in assembling objects.

In some embodiments, the position of the target object 210 is stored as a gripping position of the gripping component 140. In some embodiments, the position of the target object 210' is stored as a dropping position of the gripping component 140.

In some embodiments, the reflective photoelectric sensor 130 is a first reflective photoelectric sensor, and the method further comprises: aligning the gripping component 140 with the target object 210 in orientation based on output signals from the first reflective photoelectric sensor and a second reflective photoelectric sensor 150 arranged on the gripper 120.

In some embodiments, aligning the gripping component 140 with the target object 210 in orientation comprises: causing the first and second reflective photoelectric sensors 130, 150 to move towards a side 230 of the target object 210; determining a first time point when a change in the output signal from the first reflective photoelectric sensor 130 exceeds the threshold; determining a second time point when a change in the output signal from the second reflective photoelectric sensor 150 exceeds the threshold; and if the first time point is different from the second time point, causing the gripper 120 to rotate to align the gripping component 140 with the target object 210 in orientation.

In some embodiments, the reflective photoelectric sensor 130 is a first reflective photoelectric sensor, and the method further comprises: causing a lower surface 180 of the gripping component 140 to be parallel to an upper surface 240 of the target object 210 based on output signals from the first reflective photoelectric sensor, and a third and a fourth reflective photoelectric sensors 160, 170 arranged on the gripper 120.

In some embodiments, causing the lower surface 180 of the gripping component 140 to be parallel to the upper surface 240 of the target object 210 comprises: causing the first, third and fourth reflective photoelectric sensors 130, 160, 170 to locate above the target object 210; determining respective distances between the upper surface 240 of the target object 210 and the first, third and fourth reflective photoelectric sensors 130, 160, 170 based on the output signals from the first, third and fourth reflective photoelectric sensors 130, 160, 170; and if at least one of the distances is different from the others, causing the gripper 120 to rotate such that the lower surface 180 of the gripping component 140 is parallel to the upper surface 240 of the target object 210. The subject matter described herein may be embodied as a device comprising a processing unit and a memory. The memory is coupled to the processing unit and stores instructions for execution by the processing unit. The instructions, when executed by the processing unit, cause the device to perform the method as described above.

In the context of the subject matter described herein, a memory may be any tangible medium that can contain, or store a program for use by or in connection with an instruction execution system, apparatus, or device. The memory may be a machine readable signal medium or a machine readable storage medium. A memory may include but not limited to an electronic, magnetic, optical, electromagnetic, infrared, or semiconductor system, apparatus, or device, or any suitable combination of the foregoing. More specific examples of the memory would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. An apparatus for use with a robot, the apparatus comprising:
    a reflective photoelectric sensor arranged on a gripper of the robot;
        wherein the reflective photoelectric sensor is configured to emit a light beam, and generate an output signal based on a light intensity of a reflected light beam;
    a camera;
        wherein the camera is located remotely from the gripper of the robot; and
    a controller electrically communicable with the reflective photoelectric sensor;
        wherein the controller is configured to:
            cause the reflective photoelectric sensor to emit the light beam to scan over a target object and generate the output signal based on the reflected light beam;
            monitor changes in the output signal from the reflective photoelectric sensor;
            for each detected change in the output signal exceeding a threshold, determine a coordinate of a gripping component on the gripper in a robot coordinate system, to obtain a set of coordinates;
            cause the gripping component to grip the target object;
            cause the camera to capture an image containing the reflective photoelectric sensor and the target object gripped by the gripping component;
            determine, from the image, an actual offset value between the reflective photoelectric sensor and the target object gripped by the gripping component;
            store the actual offset value as a predefined offset value;
            determine a position of the target object in the robot coordinate system based on the set of coordinates and the predefined offset value between the reflective photoelectric sensor and the gripping component; and
            store the position of the target object in a memory and output the position to the robot for future use in assembling objects.

2. The apparatus according to claim 1, wherein the position of the target object is stored as a gripping position of the gripping component.

3. The apparatus according to claim 1, wherein the position of the target object is stored as a dropping position of the gripping component.

4. The apparatus according to claim 1, wherein the gripping component includes a clamping jaw, a vacuum chuck, or an electromagnet.

5. The apparatus according to claim 1, wherein the reflective photoelectric sensor is a first reflective photoelectric sensor, the apparatus further comprises a second reflective photoelectric sensor arranged on the gripper, and the controller is further configured to:
    align gripping component with the target object in orientation based on output signals from the first and second reflective photoelectric sensors.

6. The apparatus according to claim 5, wherein the controller is configured to align the gripping component with the target object in orientation by:
    causing the first and second reflective photoelectric sensors to move towards a side of the target object;
    determining a first time point when a change in the output signal from the first reflective photoelectric sensor exceeds the threshold;
    determining a second time point when a change in the output signal from the second reflective photoelectric sensor exceeds the threshold; and
    if the first time point is different from the second time point, causing the gripper to rotate to align the gripping component with the target object in orientation.

7. The apparatus according to claim 1, wherein the reflective photoelectric sensor is a first reflective photoelectric sensor, the apparatus further comprises a third and a fourth reflective photoelectric sensors arranged on the gripper, and the controller is further configured to:
    cause a lower surface of the gripping component to be parallel to an upper surface of the target object based on output signals from the first, third and fourth reflective photoelectric sensors.

8. The apparatus according to claim 7, wherein the controller is configured to cause the lower surface of the gripping component to be parallel to the upper surface of the target object by:
    causing the first, third and fourth reflective photoelectric sensors to locate above the target object;
    determining respective distances between the upper surface of the target object and the first, third and fourth reflective photoelectric sensors based on the output signals from the first, third and fourth reflective photoelectric sensors; and
    if at least one of the distances is different from the others, causing the gripper to rotate such that the lower surface of the gripping component is parallel to the upper surface of the target object.

9. The apparatus according to claim 1, wherein the reflective photoelectric sensor is a reflective optical fiber sensor or a laser displacement sensor.

10. A method for a controller to determine a position of a target object in a robot coordinate system for use with a robot, the method comprising:
    causing a reflective photoelectric sensor arranged on a gripper of the robot and electrically communicable with the controller to scan over a target object with a light beam;
    monitoring changes in an output signal from the reflective photoelectric sensor based on a light intensity of a reflected light beam;
    for each detected change in the output signal exceeding a threshold, determining a coordinate of a gripping component on the gripper in a robot coordinate system, to obtain a set of coordinates;
causing the gripping component to grip the target object;
causing a camera to capture an image containing the reflective photoelectric sensor and the target object gripped by the gripping component;
determining, from the image, an actual offset value between the reflective photoelectric sensor and the target object gripped by the gripping component;
store the actual offset value as a predefined offset value;
determining a position of the target object in the robot coordinate system based on the set of coordinates and the predefined offset value between the reflective photoelectric sensor and the gripping component; and
storing the position of the target object in a memory and outputting the store position to the robot for future use in assembling objects;
wherein the camera is located remotely from the gripper of the robot.

11. The method according to claim 10, wherein the position of the target object is stored as a gripping position of the gripping component.

12. The method according to claim 10, wherein the position of the target object is stored as a dropping position of the gripping component.

13. The method according to claim 10, wherein the gripping component includes a clamping jaw, a vacuum chuck, or an electromagnet.

14. The method according to claim 10, wherein the reflective photoelectric sensor is a first reflective photoelectric sensor, and the method further comprises:
aligning the gripping component with the target object in orientation based on output signals from the first reflective photoelectric sensor and a second reflective photoelectric sensor arranged on the gripper.

15. The method according to claim 14, wherein aligning the gripping component with the target object in orientation comprises:
causing the first and second reflective photoelectric sensors to move towards a side of the target object;
determining a first time point when a change in the output signal from the first reflective photoelectric sensor exceeds the threshold;
determining a second time point when a change in the output signal from the second reflective photoelectric sensor exceeds the threshold; and
if the first time point is different from the second time point, causing the gripper to rotate to align the gripping component with the target object in orientation.

16. The method according to claim 10, wherein the reflective photoelectric sensor is a first reflective photoelectric sensor, and the method further comprises:
causing a lower surface of the gripping component to be parallel to an upper surface of the target object based on output signals from the first reflective photoelectric sensor, and a third and a fourth reflective photoelectric sensors arranged on the gripper.

17. The method according to claim 16, wherein causing the lower surface of the gripping component to be parallel to the upper surface of the target object comprises:
causing the first, third and fourth reflective photoelectric sensors to locate above the target object;
determining respective distances between the upper surface of the target object and the first, third and fourth reflective photoelectric sensors based on the output signals from the first, third and fourth reflective photoelectric sensors; and if at least one of the distances is different from the others, causing the gripper to rotate such that the lower surface of the gripping component is parallel to the upper surface of the target object.

18. The method according to claim 10, wherein the reflective photoelectric sensor is a reflective optical fiber sensor or a laser displacement sensor.

19. A robot comprising:
a reflective photoelectric sensor arranged on a gripper of the robot; and
a controller electrically communicable with the reflective photoelectric sensor and configured to:
cause the reflective photoelectric sensor to scan over a target object by emitting a light beam and generating an output signal based on a light intensity of a reflected light beam;
monitor changes in the output signal from the reflective photoelectric sensor;
for each detected change in the output signal exceeding a threshold, determine a coordinate of a gripping component on the gripper in a robot coordinate system, to obtain a set of coordinates;
causing the gripping component to grip the target object;
causing a camera to capture an image containing the reflective photoelectric sensor and the target object gripped by the gripping component;
determining, from the image, an actual offset value between the reflective photoelectric sensor and the target object gripped by the gripping component;
store the actual offset value as a predefined offset value;
determine a position of the target object in the robot coordinate system based on the set of coordinates and the predefined offset value between the reflective photoelectric sensor and the gripping component; and
store the position of the target object in a memory and output the stored positions to the robot for future use in assembling objects;
wherein the camera is located remotely from the gripper of the robot.

20. A computer program product tangibly stored in a non-transient computer readable medium and including machine executable instructions which, when executed, result in:
causing a reflective photoelectric sensor arranged on a gripper of a robot to emit a light beam to scan over a target object and generate an output signal based on a light intensity of a reflected light beam;
monitoring changes in the output signal from the reflective photoelectric sensor;
for each detected change exceeding a threshold, determining a coordinate of a gripping component on the gripper in a robot coordinate system, to obtain a set of coordinates;
causing the gripping component to grip the target object;
causing a camera to capture an image containing the reflective photoelectric sensor and the target object gripped by the gripping component;
determining, from the image, an actual offset value between the reflective photoelectric sensor and the target object gripped by the gripping component;
store the actual offset value as a predefined offset value;
determining a position of the target object in the robot coordinate system based on the set of coordinates and the predefined offset value between the reflective photoelectric sensor and the gripping component; and storing the position of the target object in the computer readable medium and outputting the stored positions to the robot for future use in assembling objects;

wherein the camera is located remotely from the gripper of the robot.

* * * * *